Oct. 14, 1958 R. B. KELLY ET AL 2,856,224
MEANS FOR MOUNTING JETTISONABLE STORES ON AIRCRAFT
Filed June 2, 1955 5 Sheets-Sheet 1
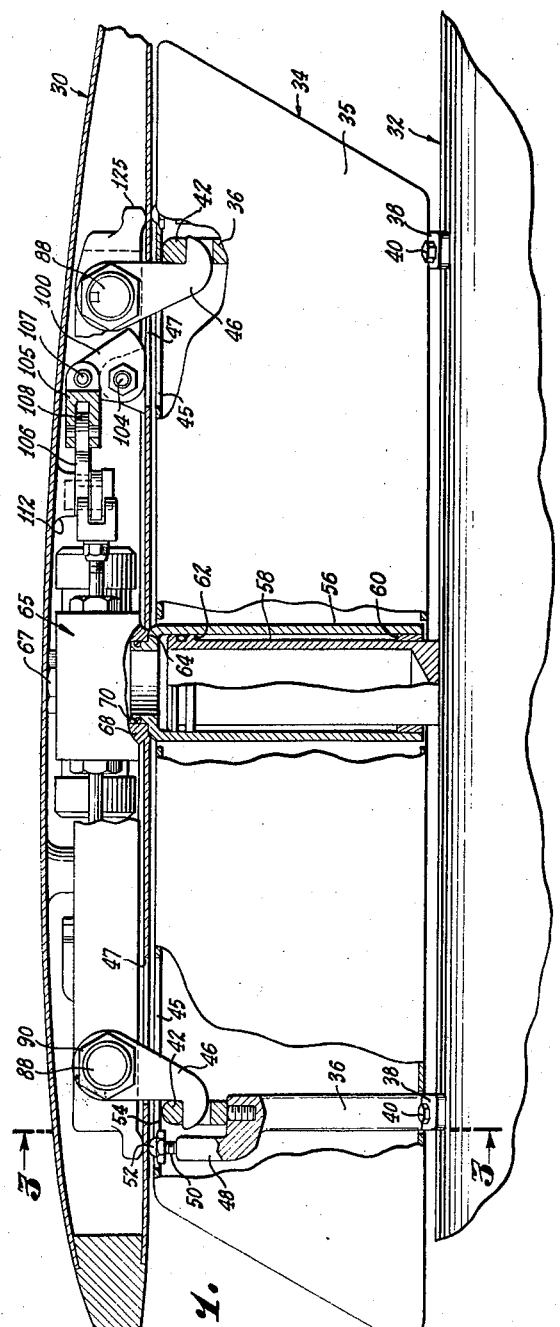
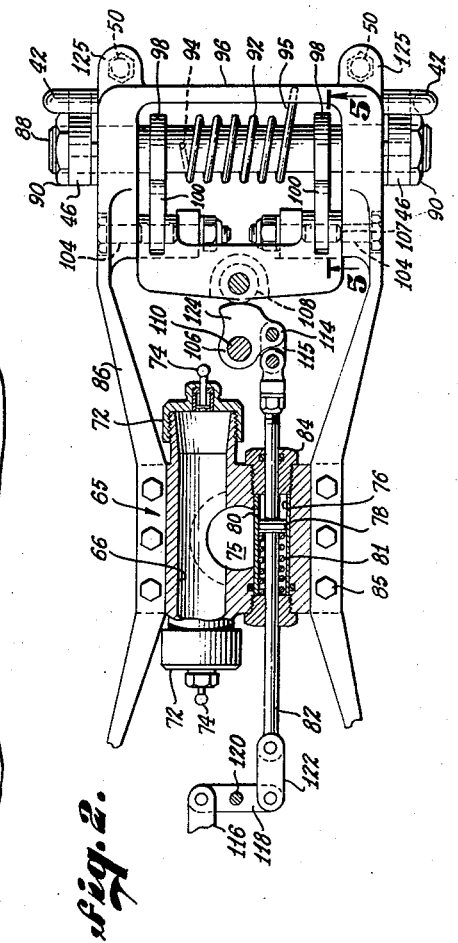
ROBERT B. KELLY,
JAMES J. SLOAN,
INVENTORS.
BY George J Smyth
ATTORNEY.

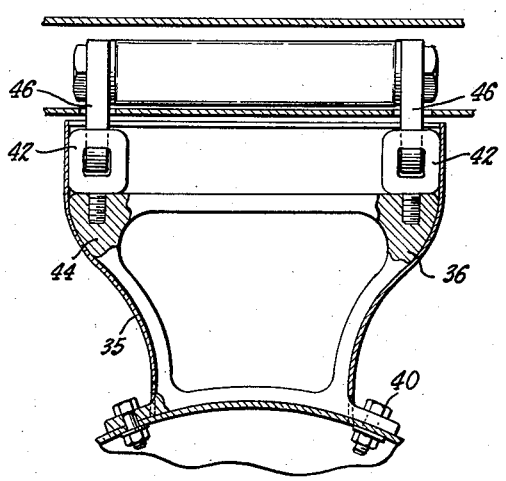
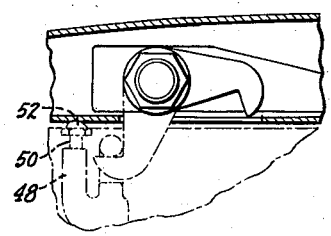
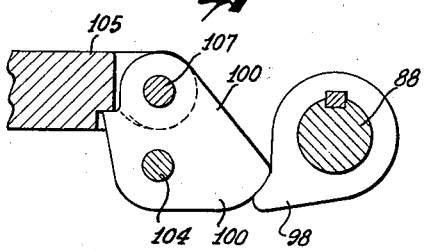
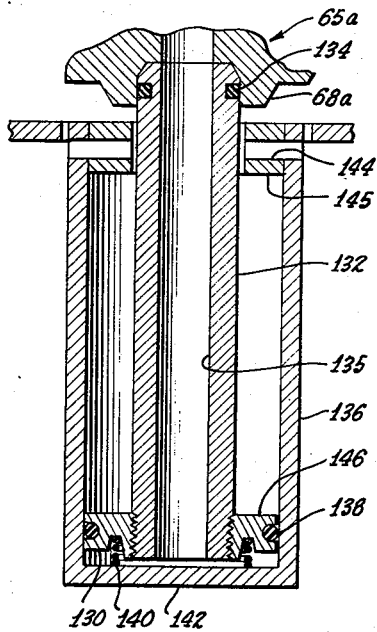

Oct. 14, 1958  R. B. KELLY ET AL  2,856,224
MEANS FOR MOUNTING JETTISONABLE STORES ON AIRCRAFT
Filed June 2, 1955  5 Sheets-Sheet 3
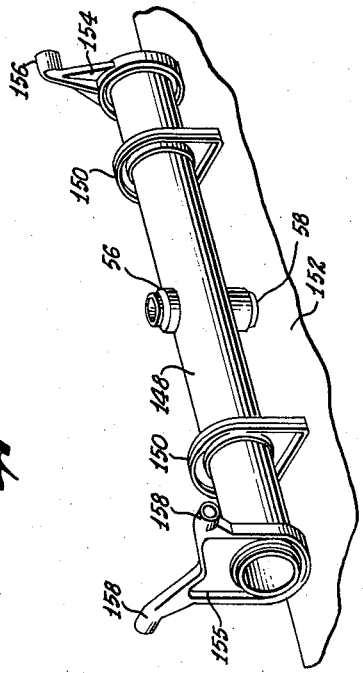
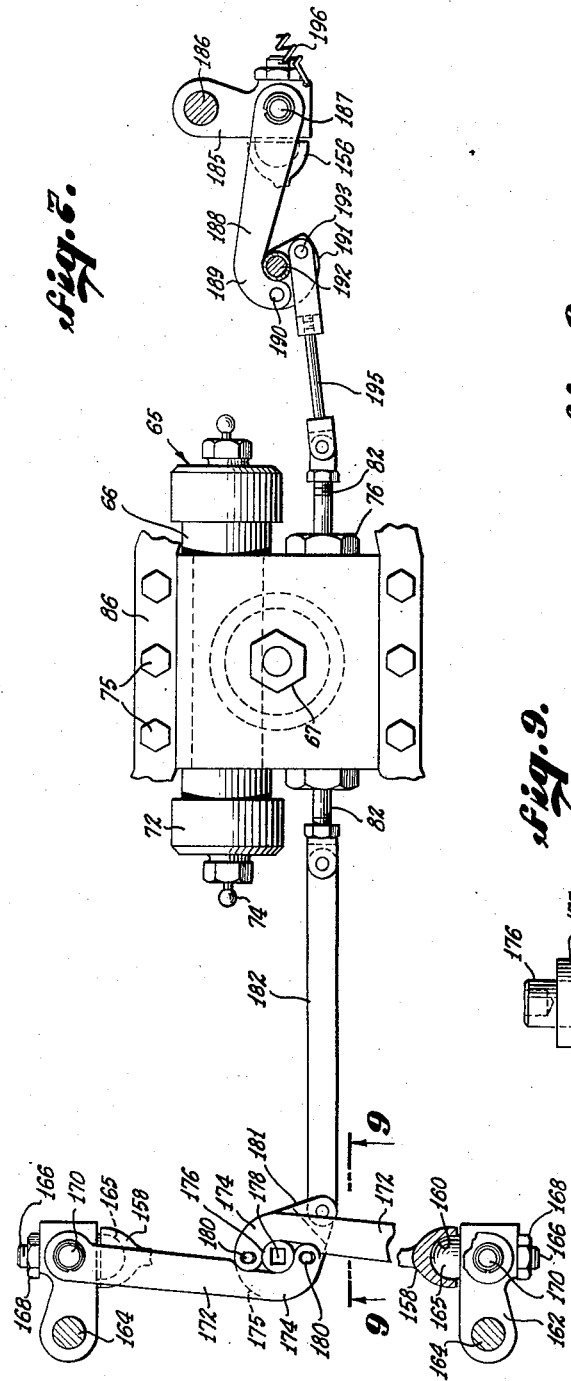
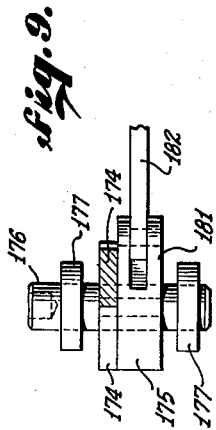
ROBERT B. KELLY,
JAMES J. SLOAN,
INVENTORS.
BY George J. Smyth
ATTORNEY.

Oct. 14, 1958 R. B. KELLY ET AL 2,856,224
MEANS FOR MOUNTING JETTISONABLE STORES ON AIRCRAFT
Filed June 2, 1955 5 Sheets-Sheet 4
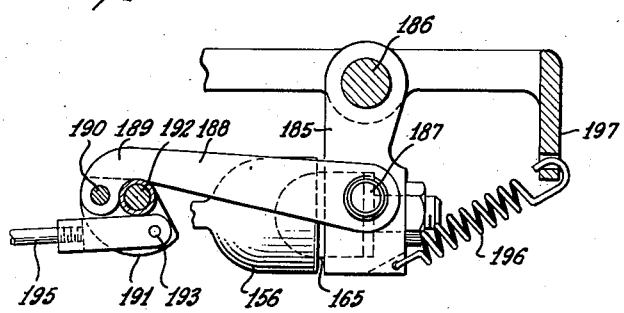
Fig. 10.
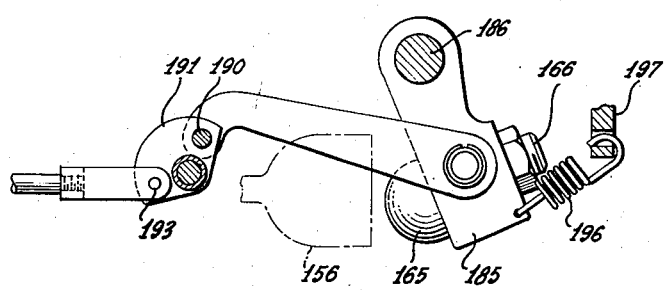
Fig. 11.
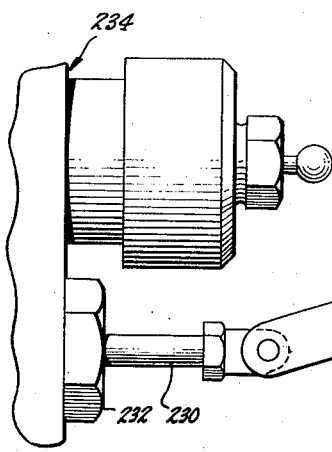
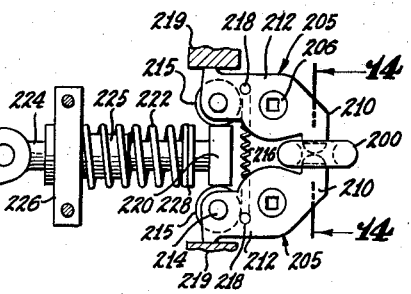
Fig. 12.
ROBERT B. KELLY,
JAMES J. SLOAN,
INVENTORS.
BY George W. Smyth
ATTORNEY.

Oct. 14, 1958 R. B. KELLY ET AL 2,856,224
MEANS FOR MOUNTING JETTISONABLE STORES ON AIRCRAFT
Filed June 2, 1955 5 Sheets-Sheet 5
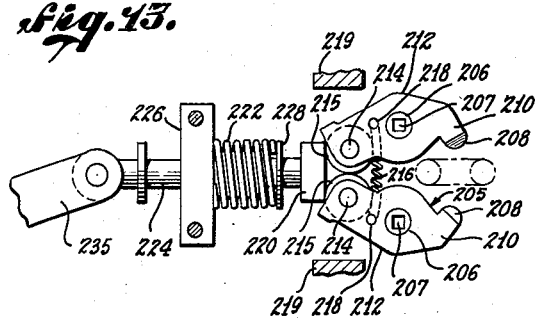
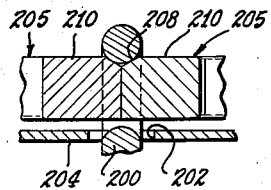
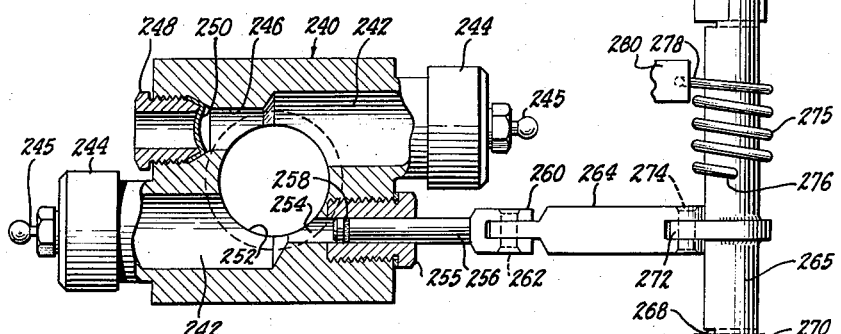
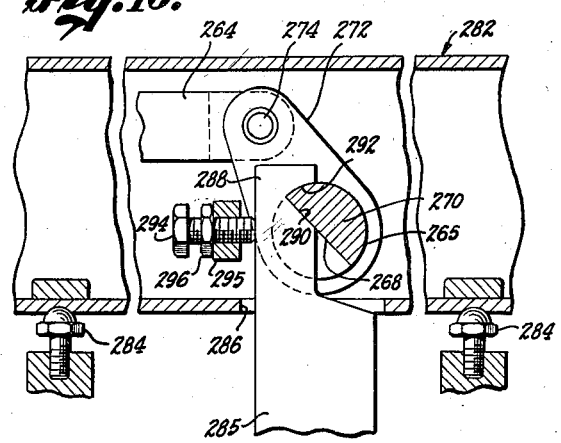
ROBERT B. KELLY,
JAMES J. SLOAN,
INVENTORS.
BY George W. Smyth
ATTORNEY.

United States Patent Office 2,856,224
Patented Oct. 14, 1958

2,856,224

MEANS FOR MOUNTING JETTISONABLE STORES ON AIRCRAFT

Robert B. Kelly, Los Angeles, and James J. Sloan, West Los Angeles, Calif., assignors to Pastushin Aviation Corporation, Los Angeles, Calif.

Application June 2, 1955, Serial No. 512,635

13 Claims. (Cl. 294—83)

This invention relates to means for mounting a jettisonable store such as an auxiliary fuel tank on an aircraft in a releasable manner and for jettisoning the store by the force of an explosive charge in the course of flight. In general, the invention is directed to the problem of mounting a store on a very thin aircraft wing in such manner as to leave no drag-producing projection whatsoever in the air stream after the store is ejected.

In accord with the present invention, a latch mechanism as well as a breech for actuating the latch mechanism by explosive force are permanently mounted inside the normal configuration of the thin wing. The fluid pressure created by the explosion is conveyed to a cylinder and a cooperating piston to apply the ejective force to the store. The present invention provides for both the cylinder and the cooperative piston to be ejected along with the store and the associated pylon structure. Thus with the latch mechanism and/or breech permanently mounted inside the thin wing and with the cylinder and piston and pylon structure ejected with the store, none of the structure for releasably attaching the store to the thin wing is left in the air stream to induce drag after the store is jettisoned. As will be explained, the invention encompasses a number of solutions to the problem of providing the required breech and latching mechanism within the configuration of a relatively thin wing.

Whereas the usual pylon structure is permanently fixed to the wing and releasably attached to the store, the pylon in the present invention is releasably attached to the aircraft and, permanently attached to the store. For the purpose of the present disclosure, therefore, the pylon may be considered as a part of the store.

The various features and advantages of the present invention will be apparent in the following detailed description considered with the accompanying drawings.

In the drawings, which are to be regarded as merely illustrative:

Figure 1 is a view partly in side elevation and partly in section illustrating a selected embodiment of the invention for releasably mounting a store on a relatively thin wing;

Figure 2 is a plan view of a portion of the mechanism shown in Figure 1 with certain parts shown in section;

Figure 3 is a fragmentary section taken as indicated by the line 3—3 of Figure 1 showing the construction of a hanger that is incorporated in the pylon structure;

Figure 4 is a fragmentary view similar to Figure 1 showing a hook member in its release position;

Figure 5 is an enlarged fragmentary section taken as indicated by the line 5—5 of Figure 2 showing a latch body and cooperating pawl that are included in the latch mechanism;

Figure 6 is a sectional view of a modified form of piston and cooperating cylinder that may be substituted for the cylinder and piston in Figure 1;

Figure 7 is a plan view with parts broken away showing a second latch mechanism that may be substituted for the latch mechanism in the above described embodiment of the invention for the purpose of releasably securing the store to the aircraft wing;

Figure 8 is a perspective view of the internal load-bearing structure of a pylon for cooperation with the latch mechanism of Figure 7;

Figure 9 is a fragmentary section taken as indicated by the line 9—9 of Figure 7 showing a portion of the latch mechanism;

Figure 10 is an enlarged detail of Figure 7 showing a portion of the latch mechanism in its effective position for releasably securing the store to the aircraft wing;

Figure 11 is a similar view showing the same portion of the latch mechanism in its release position;

Figure 12 shows the construction of another form of latch mechanism that may be substituted for the first described latch mechanism for releasably attaching a store to an aircraft wing;

Figure 13 is a fragmentary view similar to Figure 12 showing the latch mechanism in its release position;

Figure 14 is an enlarged sectional detail taken as indicated by the line 14—14 of Figure 12;

Figure 15 is a view partly in plan and partly in section showing the construction of still another latch mechanism that may be employed for releasably attaching a store to an aircraft wing; and Figure 16 is an enlarged sectional view taken as indicated by the line 16—16 of Figure 15.

Figure 1 shows a relatively thin aircraft wing, generally designated by numeral 30, and shows a store in the form of a jettisonable fuel tank 32 that is releasably mounted on the underside of the aircraft wing. The fuel tank 32 is equipped with structure, generally designated by numeral 34, that may be aptly termed a pylon since its external shape and its function are largely similar to the shape and function of a conventional pylon for attaching a store to an aircraft. The pylon 34 may be considered a part of the fuel tank 32 since it is permanently attached thereto. Thus the pylon and fuel tank considered together may be regarded as a jettisonable store.

The pylon 34 includes an elongated streamlined housing 35 which is unitary with a pair of longitudinally spaced hangers 36. The two hangers 36 are enclosed by the housing 35 except for a lower pair of flanges 38 of each housing. The flanges 38 are rigidly attached to the fuel tank 32 by suitable cap screws 40 which engage interior reinforcement structure (not shown) of the fuel tank.

Each of the hangers 36 is rigidly united with the housing 35 and, as best shown in Figure 3, each of the hangers is provided with a pair of laterally spaced shackle loops 42. In the construction shown, each of the shackle loops 42 is of a character of an eye-bolt having a shank 44 threaded into the hanger. The housing 35 of the pylon has longitudinal slots 45 in its top wall adjacent each of the shackle loops 42 to receive a corresponding hook member 46. There are four such hook members adapted to extend retractably downward from the interior of the wing 30 through wing slots 47 into releasable engagement with the corresponding shackle loops 42 for releasable attachment of the store to the wing.

As best shown in Figure 1, each of the hangers 36 has a pair of upwardly extending arms 48 integral therewith, the two arms being spaced apart laterally to serve as means for stabilizing the fuel tank and pylon against lateral sway. For this purpose each of the arms has an adjustable extension in the form of a screw 50 having a hexagonal head 52. Each of the screws 50 extends upward through an opening 54 in the upper wall of the pylon housing 35 for direct contact with the underside of the wing 30. The four screws 50 are adjusted for intimate pressure contact with the wing 30 for cooperation with the four hook members 46 for the desired prevention of sway.

Incorporated into the structure of the pylon housing 35 at a location longitudinally intermediate the two hangers 36 is a cylinder member 56 and a piston member 58, the purpose of which is to exert ejective force against the store in response to fluid pressure created by an explosive charge. One of these two members is in abutment with the store or fuel tank 32 and the other is in abutment with the wing 30. In this instance, the piston member 58 is directed downward against the fuel tank and the cylinder member 56 extends upward to exert counter thrust against the aircraft wing 30.

The open upper end of the cylinder 56 is in releasable engagement with the aircraft wing and is adapted to receive the high-pressure fluid to cause the piston member 58 to thrust downwardly with simultaneous upward reaction thrust by the cylinder member 56. Preferably the lower end of the cylinder member 56 has an inner circumferential shoulder 60 in the path of downward movement of an outer circumferential shoulder 62 at the upper end of the piston member. Thus when the piston member 58 is moved downwardly in response to the high-pressure fluid to thrust the fuel tank 32 away from the aircraft, the shoulder 62 of the piston member makes impact against the shoulder 60 of the surrounding cylinder member 56 and this impact force is sufficient to eject the cylinder member away from the aircraft.

It is important to note that the upper end of the cylinder member 56 is reduced in diameter to form an inner annular shoulder 64 and that the effective area of this annular shoulder with respect to the upward thrust of high-pressure fluid inside the cylinder is adequate to cause the cylinder member to tend to stay in abutment with the wing 30 in response to the initial fluid pressure. In other words, the effective area of the annular shoulder 64 for creating upward thrust in response to fluid pressure is greater than the effective area of the upper rim of the cylinder member. When the piston shoulder 62 strikes the cylinder shoulder 60, however, the cylinder member 56 is jerked away from the wing in opposition to this pressure differential. Thus the arrangement automatically maintains the cylinder member 56 in its normal effective position for receiving the high-pressure fluid until the piston member 58 has completed its function of thrusting the fuel tank 32 away from the aircraft.

Mounted inside the wing 30 is what may be termed a breech 65 which includes a combustion chamber 66 and a short downwardly extending cylindrical skirt 68. The upper constricted end of the cylinder member 56 is slidingly seated in the cylindrical skirt 68 and is sealed therein by a suitable O-ring 70 that is mounted in a corresponding circumferential groove in the cylinder member. Preferably the O-ring 70 is in sufficiently effective engagement with the skirt 68 to withstand the weight of the cylinder member 56 so that the cylinder member will stay in place for the purpose of facilitating the assembly of the various parts in preparation for a flight.

The combustion chamber 66, which may be equipped with a frangible blow-out plug 67 is of cylindrical configuration to receive explosive charges in the form of the usual cartridges and for this purpose is provided with removable screw threaded caps 72 at its opposite ends, each of these caps being provided with the usual ignition means 74 for detonating the explosive charges electrically by remote control. The cylindrical skirt 68 of the breech 65 forms a large port 75 whereby fluid pressure generated in the combustion chamber may be transmitted to the interior of the cylinder member 56 for action against the piston member 58.

Incorporated in the structure of the breech 65 is an auxiliary cylinder 76 enclosing an auxiliary piston 78 for release actuation of the two hook members 46. This auxiliary cylinder 76 has a small peripheral port 80 in communication with the large port 75, this peripheral port being suitably restricted in dimension to cause actuating pressure to build up in the auxiliary cylinder in a somewhat retarded manner that permits substantial pressure rise in the main cylinder member 56 before hook members 46 are released.

The auxiliary piston 78 which is normally held by a spring 81 in the position shown in Figure 2 is mounted on a piston rod 82 that extends in both directions from the piston through the opposite ends of the auxiliary cylinder. In the construction shown, the opposite ends of the cylinder are closed by suitable bushings 84 in which the piston rod 82 is slidingly mounted. A feature of the invention is that both the combustion chamber 66 and the auxiliary cylinder 76 are in recumbent position, this arrangement making it possible to house the breech 65 within the vertically restricted dimension of the relatively thin wing 30.

As best shown in Figure 2, the breech 65 may be mounted by cap screws 85 on an elongated, generally rectangular frame 86 that is united with the internal structure of the wing 30. Journalled in the two opposite ends of the frame 86 are cross shafts 88 for fixedly carrying the four hook members 46. In the construction shown, each of the hook members 46 is keyed to the corresponding end of a cross shaft 88 and is secured thereon by a suitable nut 90. Preferably yielding means is provided to tend to rotate each of the cross shafts 88 in the direction to release the two hooks 46 thereon from the corresponding shackle loops 42. For this purpose, a suitable spring 92 coiled around each of the cross shafts 88 has one end 94 anchored in a bore in the cross shaft and has its second end 95 hooked under the adjacent end member 96 of the frame 86.

Each of the two cross shafts 88 carries a pair of pawl members 98 which, as best shown in Figure 5, are normally engaged by a corresponding pair of latch elements 100 to prevent release rotation of the cross shaft. The two latch elements 100 are pivotally mounted on corresponding bolts 104. It can be seen that the tendency for the cross shaft 88 to rotate in a release direction under the force exerted by the spring 92 tends to cause the latch elements 100 to rotate in a release direction about the bolts 104. Normally release rotation of the two latch elements 100 is prevented by a blocking member 105 in cooperation with a latching cam 106. The blocking member 105, which is pivotally connected to the two latch elements 100 by hinge pins 107, is preferably of forked construction to journal a follower for the cam in the form of a roller 108.

The latching cam 106 which is shown in its normal latching or blocking position in Figure 2, is journalled on a pivot 110 carried by an overhead boss 112 and has a lateral ear 114 by means of which the cam may be actuated by the previously mentioned piston rod 82 that is mounted in the auxiliary cylinder 76. As shown in Figure 2, one of the two latching cams 106 has its operating ear 114 connected to the piston rod 82 by a short link 115. The ear 114 of the other latching cam 106 is connected to a relativley long link 116 which is pivotally connected to one arm of a transverse lever 118. The lever 118 is mounted on a pivot 120 with its second arm connected to the piston rod 82 by a short link 122.

It is apparent that when the detonation of explosive material in the combustion chamber 66 creates an effective pressure rise inside the auxiliary cylinder 76, the auxiliary piston 78 is forced to the left as viewed in Figure 2 to cause both of the latching cams 106 to rotate to release positions with the lobes 124 of the two cams swung out of the way of the rollers 108. With the lobes 124 out of the way, the hinged blocking member 105 at each end of the frame 86 is free to permit the corresponding pair of latch elements 100 to swing out of engagement with the correspondig pair of pawl members 98. The springs 92 thereupon rotate the two cross shafts 88 to cause the four hook members 46 to swing out of engagement with the shackle loops 42.

The manner in which this first embodiment of the apparatus functions to serve its purpose may be readily understood from the foregoing description. In the course of normal flight with the fuel tank 32 serving its purpose of supplying fuel to the aircraft, the various parts are positioned as shown in Figures 1, 2, and 3. It will be noted that the cylinder member 56 extends upward into the cylindrical skirt 68 of the breech 65 and therefore may be said to be in abutment with the aircraft or aircraft wing. The piston member 58, on the other hand, extends downward in abutment with the fuel tank 32. The hook members 46 are in engagement with the shackle loops 42 to support the store, or combined pylon and fuel tank, at four support points.

The four stabilizers comprising the four adjustable screws 50 are tightened against the underside of the wing 30 in a manner to preload the four hook members 46. This preloading eliminates any free play or side-sway on the part of the store whatsoever and, in addition, causes a constant force to be applied to each of the four hook members. It is apparent that the weight of the store will tend to cause the four hook members 46 to release in opposition to the springs 92 and that this tendency is increased by the preloading of the hook members. The underside of the wing 30 at each of the stabilizer screws 50 is reinforced by a coresponding portion 125 (Figure 1) of the frame 86 inside the wing. This reinforcement resists the upward pressure of each of the adjustable stabilizer screws 50 and causes the frame to transmit the preloading forces to the hook members 46.

When the explosive material is detonated in the combustion chamber 66 the resulting hot gas passes downward through the large port 75 into the upper end of the cylinder member 56 to create a pressure rise inside the cylinder member. This pressure rise causes the piston 58 to thrust downward against the fuel tank 32 and also causes the cylinder member 56 to thrust upward against the wing 30, as heretofore explained.

When the pressure rise in the cylinder member 56 reaches an effective magnitude, the pressure rise in the auxiliary cylinder 76 actuates the auxiliary piston 78 to cause release rotation of the four hook members 46 in the manner heretofore described. With the store thus disengaged from the wing 30, the piston 58 is free to move downward for ejection of the fuel tank 32 along with the pylon 34. When the outer shoulder 62 of the piston member 58 strikes the inner shoulder 60 of the cylinder member 56, the cylinder member 56 is jerked free of the cylindrical skirt 68 of the breech. Thus the cylinder member 56 is ejected away from the wing 30 along with the piston 58, the fuel tank 32, and the pylon 34.

It is important to note that the cylindrical skirt 68 terminates short of the undersurface of the wing 30 so that the ejection of the cylinder member 56 leaves this portion of the wing free from any projections in the airstream. When the store is released the two springs 92 rotate the two cross shafts 88 to swing the four hook members 46 upward through corresponding wing slots 47 in the bottom of the wing to cause each of the hook members to be retracted completely inside the wing. It is apparent that no projections whatsoever are left in the airstream after the store is jettisoned.

Figure 6 shows how this first embodiment of the invention may be modified by a certain reversal with respect to the piston member and the cylinder member whereby the piston member instead of the cylinder member is in abutment with the aircraft wing and the cylinder member is in abutment with the store. In Figure 6, the breech 65a is of the general construction heretofore described but is provided with a downwardly extending skirt 68a that is of somewhat smaller inside diameter than the previously descrbied cylindrical skirt 68.

A piston member 130 has a stem or shank 132, the upper end of which slidingly telescopes into the breech skirt 68a. An O-ring 134 is mounted on the upper end of the stem 132 for sealing purposes and preferably serves as friction means of sufficient effectiveness to support the weight of the piston. The stem 132 is hollow to provide a fluid passage 135 for communication between the breech 65a and the lower face of the piston member 130. The piston member 130 is slidingly mounted in a cylinder member 136 that is unitary with the pylon structure 34. The piston member 130 is provided with an O-ring 138 for sealing contact with the cylinder member 136 and preferably a suitable coil spring 140 is normally in compression between the piston and the lower end wall 42 of the cylinder member. In the construction shown, a ring member 144 mounted in the upper end of the cylinder member 136 provides a downwardly directed shoulder 145 for engagement with an upwardly directed shoulder 146 of the piston member 130 when the store is ejected.

The operation of this modification may be readily understood. In the course of normal flight prior to the ejection of the store, the coil spring 140 exerts a desirable upward pressure on the piston member 130 to tend to keep the stem 132 of the piston seated in the breech skirt 68a. When the explosive is detonated in the combustion chamber of the breech, the hot gas moves downward through the fluid passage 135 to thrust against the end wall 142 of the cylinder member 136 for the application of ejective force against the store. At the same time, the pressure of the hot gas upward against the lower face of the piston member 130 tends to maintain the piston member in its normal position with the stem in pressure abutment against the breech 65a. When the pylon is unlatched or disengaged from the aircraft wing in the manner heretofore described, it is thrust away from the aircraft wing by virtue of the downward pressure on the end wall 142 of the cylinder member 136. As the pylon moves away from the aircraft wing, the ring member 144 strikes the shoulder 146 of the piston member 130 to jerk the piston member away from the aircraft wing.

Figures 7 to 11 show how another form of latch mechanism may be employed to releasably secure a store to the underside of a relatively thin wing of an aircraft. In this form of the invention, the pylon housing encloses a support structure shown in Figure 8 which consists essentially of a longitudinal cylindrical beam 148 equipped with a pair of saddles 150 for permanent attachment to the upper side of a fuel tank 152. The beam 148 is also equipped with a forward hanger 154 and a rearward hanger 155 for releasable engagement by a cooperating latch mechanism inside the aircraft wing. The forward hanger 154 has an upwardly and forwardly extending single hanger arm 156 and the rearward hanger 155 has a pair of upwardly and laterally extending hanger arms 158. As best shown in Figure 7 each of the three hanger arms has a terminal socket 160 of spherical curvature. It is apparent that the three hanger arms may extend upward into the interior of the aircraft wing for releasable engagement with the latch mechanism shown in Figure 7.

The structure shown in Figure 7 includes the same breech 65 as employed in the first described embodiment of the invention. This breech is mounted on the usual frame 86 inside the wing and has the previously described piston rod 82 that is actuated by an auxiliary piston in an auxiliary cylinder 76.

The two sockets 160 of the rearward pair of hanger arms 158 may be releasably engaged by a jaw assembly comprising two jaw members 162. Each of these jaw members is pivotally mounted on an upright pivot means 164 for swinging movement in a generally horizontal plane. Each of the jaw members 162 carries a latch member 165 shaped to engage with one of the sockets 160, each of these latch members having a shank 166 that is threaded into the jaw member and secured by a lock nut 168.

In the construction shown, each of the jaw members 162 is pivotally connected by a pin 170 with a corresponding link 172. Each of the links 172 has a hook end 174 and it is contemplated that these hook ends will be connected to a suitable rotary operating member 175. The operating member 175 is keyed to an upright shaft 176 that is journalled in bearings 177. The upper end of the upright shaft has a suitable square socket 178 for rotation of the shaft and rotary operating member by a wrench when desired. The operating member 175 has a pair of diametrically positioned pins 180 on its upper side for pivotal engagement by the two hook ends 174 of the two links 172.

As may be seen in Figure 7, the hook ends 174 of the two links 172 extend around the axis of the rotary operating member 175 at the normal closed position of the jaw assembly with the axis of the two pins 180 substantially in a plane that is defined by the axis of the upright shaft 176 along with the axes of the pins 170. Thus the described jaw assembly is irreversible in the sense that any tendency of the two jaw members 162 to swing to release positions will not create a turning moment on the rotary operating member 175. The operating member 175 has a radial arm or extension 181 that serves as an operating arm for release action and this arm is connected by a link 182 to one end of the previously described piston rod 82.

The latch mechanism shown in Figure 7 includes a third single jaw member 185 that is provided with a latch member 165 to seat in the spherical socket in the forward hanger arm 156. The jaw member 185 is mounted on an upright pivot means 186 and has a pair of trunnions 187 for pivotal connection to a corresponding pair of links 188. The two links 188 have hook ends 189 that are pivotally connected by pins 190 to a rotary operating member or link means 191. The rotary operating member 191 is keyed to a suitably journalled upright shaft 192 having the usual socket (not shown) for rotation by a wrench. The rotary operating member 191 is connected by a pin 193 with an operating link 195 that is, in turn, pivotally connected to the second end of the previously described piston rod 82.

In the closed or effective position of the third jaw member 185, shown in Figures 7 and 10, the common axis of the pivot pins 190 is substantially in the same plane as the axis of the upright shaft 192 and the axis of the trunnions 187. Thus this forward jaw member is irreversible in the sense previously explained. Preferably, a suitable coil spring 196 has one end connected to the jaw member 185 and the other end connected to a fixed member 197 to urge the jaw to open position thereby to provide a snap action in the release operation of the latch mechanism.

It is apparent that with the three hanger arms 156 and 158 properly inserted in the aircraft wing, the upright shaft 176 may be rotated by a wrench to close the two jaw members 162 on the rearward pair of hanger arms 158 and it is also apparent that the upright shaft 192 may be similarly rotated to bring the third jaw member 185 into engagement with the forward hanger arm 156. When the explosive material in the breech 65 is detonated to create a pressure rise for ejection of the pylon and fuel tank, the piston rod 82 shifts to the left as shown in Figure 7. This leftward shift of the piston rod actuates the operating member 175 clockwise as viewed in Figure 7 for release movement of the two jaws 162 and also rotates the rotary operating member 191 clockwise, as viewed in Figures 10 and 11, to swing the forward jaw 185 to its release position.

Figures 12, 13, and 14 illustrate a latch mechanism for releasably securing the store which also may be substituted for the latch mechanism in the first described embodiment of the invention. In this practice of the invention, it is contemplated that the store will be attached to the aircraft by only two shackle loops, the two shackle loops being spaced apart longitudinally of the store and being adapted to extend upward into the interior of the aircraft wing. Thus Figure 12 shows one of the shackle loops 200 extending upwardly through an aperture 202 in the skin 204 on the underside of the aircraft wing.

Each of the shackle loops 200 is releasably engaged by a corresponding pair of rotary hook members 205 that are fixedly mounted on a corresponding pair of upright rods 206 inside the wing. Each of the upright rods 206 is journalled in suitable bearings (not shown) inside the wing and the upper end of each of the rods forms a socket 207 which is accessible for the insertion of a socket wrench therein. The rotary hook members rotate in a substantially horizontal plane between the closed position shown in Figure 12 and the open position shown in Figure 13. Preferably the two rotary hook members 205 are formed with bevels 208 on their hook ends in which the corresponding shackle loop 200 normally seats as best shown in Figure 14. It is apparent that by virtue of this arrangement, the downward thrust of the shackle loop 200 by virtue of the weight of the store tends to open the pair of rotary hook members 205 by a cam action.

Each of the hook members 205 may be in the form of a lever having a hook arm 210 for engagement with the corresponding shackle loop 200 and having a second arm 212 which may be termed the locking arm of the hook member.

Each of the two locking arms 212 is of forked construction to journal the trunions 214 of a corresponding roller 215 and a suitable coil spring 216 extends through the forked ends of the two locking arms. Each end of the coil spring may be hooked around a pin 218. It is apparent that the coil spring 216 tends to swing the two locking arms 212 together as shown in Figure 11 thereby to rotate the two hook members 205 to the open positions shown in Figure 13. Preferably the locking arms 212 abut corresponding stops 219 at their open positions.

A suitable locking means to block release operation of each pair of rotary hook members 205 may comprise a small locking block 220 which is normally positioned between the two locking arms 212 in abutment with the pair of rollers 215. In this position shown in Figure 12, the locking block 220 keeps the coil spring 216 from swinging the two locking arms 212 towards each other. When the locking block 220 is retracted as shown in Figure 13, the coil spring 216 swings the two rotary hook members 205 to their open positions.

Each of the locking blocks 220 for the two pairs of rotary hook members 205 is urged towards its normal locking position by a suitable coil spring 222. For this purpose each locking block is mounted on a slide rod 224 which is slidingly mounted in a sleeve 225 carried by a fixed support 226. The coil spring 222 is in compression with one end of the spring seating against a radial flange 228 of the slide rod and with the other end of the spring abutting the fixed support 226 around the sleeve 225.

It is apparent that the two pairs of rotary hook members 205 may be snapped open by simply retracting the locking block 220 in opposition to the springs 222. The smaller coil springs 216 interconnecting the two locking arms 212 of each pair of the rotary hook members 205 exerts force to rock the rotary hook members to their open positions and, in addition, the weight of the store transmitted to the beveled surfaces 208 of the two rotary hook members through the shackle loops 200 also tends to rotate the rotary hook members towards their open positions. The usual stabilizers (not shown) preload the shackle loops 200 with respect to their engagement with the beveled surfaces 208 and additionally tend to cause the hook members to open rapidly whenever the locking blocks 220 are retracted.

It is contemplated that the two pairs of rotary hook members 205 will be opened by a piston rod 230 which extends through the opposite ends of an auxiliary cylinder 232 of a breech 234, which breech is of the same construction as the breech 65 in the first described form of the invention. Each of the two locking blocks 220 may be connected to the piston rod 230 in any suitable manner. Thus the slide rod 224 carrying the locking block 220 in Figures 12 and 13 are pivotally connected to a link 235 which, in turn, is pivotally connected to the corresponding end of the piston rod 230.

To mount a store on the underside of an aircraft wing by means of the latch mechanism shown in Figures 12, 13 and 14 the shackles 200 of the store are inserted into the wing from below with the two pairs of rotary hook members 205 in open positions as shown in Figure 13. Socket wrenches are then inserted into the wing from above for engagement with the sockets 207 of the upright rods 206 to rotate the rods and thus rotate the hook members 205 to their open positions. When the hook members 205 are rotated to their closed positions, the corresponding spring 222 snaps the corresponding locking block 220 into position between the two rollers 215 to lock the rotary hook members at their closed positions.

When the explosive in the breech 234 is detonated to create fluid pressure for ejecting the store from the aircraft in the manner heretofore described, the fluid pressure developed in the auxiliary cylinder 232 causes the piston rod 230 to be shifted longitudinally to the left, as viewed in Figure 12, and thereby withdraws the locking blocks 220 to permit the two pairs of rotary hook members 205 to fly open for release of the corresponding two shackle loops 200.

Figures 15 and 16 show another mechanical arrangement for latching a store to an aircraft which may be substituted for any of the mechanical arrangements heretofore described. This mechanism is actuated by fluid pressure developed in a breech generally designated 240.

The breech 240 is of the same general construction as heretofore described. It has two combustion chambers 242 each of which has a threaded cap 244 which may be removed for the insertion of a cartridge, the cap being provided with the usual ignition means 245. The two combustion chambers 242 communicate with a bore 246 which is closed by a blow-out plug 248 having a replaceable frangible wall 250. In the event excessive fluid pressure develops in the breech, the frangible wall 250 yields before a dangerous pressure magnitude is reached.

The two combustion chambers 242 communicate through a large port 252 with the usual cylinder and cooperating piston for applying ejective force to the store. Both combustion chambers 242 also communicate with a small auxiliary cylinder 254 which is largely formed by a relatively long bushing 255. Slidingly mounted in the auxiliary cylinder 254 is an auxiliary piston 256 in the form of a plunger provided with a suitable O-ring 258. The outer end of the auxiliary piston 256 forms a clevis 260 which carries a pivot pin 262 for connecting the piston to an operating link 264.

The latch means controlled by the operating link 264 comprises a cross shaft 265 that is suitably journalled in a pair of spaced bearings 266. The cross shaft 265 is cut away at spaced points to provide a pair of semicircular peripheral recesses 268. The remaining semicircular portion 270 of the cross shaft 265 at each of the recesses 268 constitutes latch member. At a point intermediate the recesses 268 and latch member 270, the cross shaft 265 is provided with a rocker arm 272 that is connected to the previously mentioned operating link 264 by suitable pivot means 274. A coiled spring 275 wrapped around the cross shaft 265 has one end 276 anchored to the cross shaft and has its other end 278 in engagement with a fixed member 280. Thus the coil spring 275 tends to rotate the cross shaft 265 in a counter-clockwise direction as viewed in Figure 16.

The store that is to be carried by the aircraft wing 282 is provided with the usual stabilizer screws 284. In this instance, there are only two such stabilizer screws. The pair of adjustable stabilizer screws 284 are spaced apart along the longitudinal axis of the store and are normally tightened into pressure contact with the lower skin of the wing.

The store is releasably secured to the wing 282 by a pair of laterally spaced suspension members 285 which lie on opposite sides of the longitudinal axis of the store. Each of these suspension members extends upward through a corresponding slot 286 in the lower skin of the wing. The upper end portion 288 of each of the suspension members 285 is of reduced width and is dimensioned to extend slidingly through the corresponding semi-circular recess 268 of the cross shaft 265. This upper portion 288 of each suspension member is cut away to form a recess 290 having a surface or shoulder 292 that is of circular configuration to conform to the circular periphery of the corresponding semi-circular latch member 270.

With the two suspension members 285 inserted upward into the wing 282 to the position shown in Figure 16, the cross shaft 265 may be rotated counter-clockwise as viewed in Figure 16 to cause the two semi-circular latch members 270 to engage the corresponding two shoulders 292 formed by the two recesses 290. In this manner the suspension members 285 are latched to releasably support the store from the aircraft wing. To keep each of the suspension members 285 in engagement with the corresponding latch member 270, suitable means is required to keep the suspension member from moving laterally away from the latch member. For this purpose two screws 294 may be adjustably mounted in fixed cross members 295 inside the wing. Each of the screws 294 carries a nut to hold the screws at its adjusted position and is adjusted for abutment against the corresponding suspension member 285 in the manner shown in Figure 16.

Prior to the releasable attachment of a store to the aircraft wing 282, the spring 275 on the cross shaft 265 yieldingly holds the cross shaft and the two latch members 270 in approximately the positions shown in Figure 16. It is a simple matter, however, to apply a wrench to a square socket 298 in the end of the cross shaft 265 to rotate the latch members 270 sufficiently to pass the upper portions 288 of the suspension members 285. Upward movement of the two suspension members 285 bring the recesses 290 into positions registering with the upper ends of the two latch members 270. When the recesses 290 are registered with the latch members 270 in this manner, the latch members rotate into their effective positions shown in Figure 16 under the compulsion of the coil spring 275. The two stabilizer screws 284 are then tightened upward against the underside of the wing to preload the two suspension members 285, i. e. to cause downward reaction of the suspension members against the two latch members 270.

When the explosive charges in the two combustion chambers 242 are detonated to create fluid pressure for ejection of the store, the fluid pressure in the auxiliary cylinder 254 acting on the auxiliary piston 256 causes outward movement of the auxiliary piston and the auxiliary piston by virtue of the operating link 264 and the rocker arm 272 rotates the cross shaft 265 in clockwise direction as viewed in Figure 16. This clockwise rotation of the two semi-circular latch members 270 disengages the latch members from the suspension members 285 to release the store.

Although the now preferred embodiments of the present invention have been shown and described herein, it is to be understood that the invention is not to be limited thereto, for it is susceptible to changes in form and detail within the scope of the appended claims.

We claim:

1. A combination for mounting a jettisonable store on an aircraft and for releasing the store with ejective force, comprising: attachment structure carried by the aircraft; attachment structure carried by the store for cooperation with the first mentioned attachment structure, said two attachment structures constituting releasable latch means for mounting the store on the aircraft; means carried by the aircraft to create fluid pressure with an abrupt pressure rise; an expansible pressure chamber on said store in the form of two telescoped members, said chamber being open at its upper end to receive said fluid pressure for expansion to eject the store from the aircraft, said chamber being at its upper end in releasable engagement with the aircraft for separation therefrom for ejection of both said members along with the store; and means on the aircraft to release said latch means in response to the fluid pressure.

2. A combination as set forth in claim 1 in which said ejecting means comprises a cylinder in releasable abutment against the aircraft and a piston in the cylinder, said piston being extendable out of the lower end of the cylinder in response to the fluid pressure, said cylinder having a portion in the path of said piston for impact by the piston to cause ejection of the cylinder from the aircraft.

3. A combination for mounting a jettisonable store on an aircraft and for releasing the store with ejective force, comprising: attachment structure carried by the aircraft; attachment structure carried by the store for cooperation with the first mentioned attachment structure, said two attachment structures constituting releasable latch means for mounting the store on the aircraft; a combustion chamber carried by the aircraft to create fluid pressure with an abrupt pressure rise said combustion chamber having a downwardly directed port located away from the airstream; a downwardly extending cylinder having its upper end slidingly embraced by said port; a piston slidingly mounted in said cylinder for extension movement downward therefrom against the store to eject the store in response to said fluid pressure; and means on the aircraft to release said latch means in response to fluid pressure.

4. A combination as set forth in claim 3 in which a portion of said cylinder is in the path of downward movement of a portion of said piston for impact by the piston to eject the cylinder out of said fixed port.

5. A combination for mounting a jettisonable store on an aircraft and for releasing the store with ejective force, comprising: attachment structure carried by the aircraft; attachment structure carried by the store for cooperation with the first mentioned attachment structure, said two attachment structures constituting releasable latch means for mounting the store on the aircraft; a cylinder member; a piston member in said cylinder member, one of said members extending downward to exert ejective force against said store, the other of said members being in releasable abutment against said aircraft and forming a passage from said pressure creating means to the interior of the cylinder member to transmit said fluid pressure thereto to cause downward movement of said one member relative to said other member, said other member having greater effective area exposed to upward fluid pressure than exposed to downward fluid pressure whereby the fluid pressure inside the cylinder presses said other member upward towards the aircraft; and means to apply downward force to said other member derived from said fluid pressure after said downward movement is initiated thereby to eject said other member away from the aircraft.

6. A combination as set forth in claim 5 in which a portion of said other member is in the path of downward movement of a portion of said one member whereby said derived force is delivered to said other member by impact of said one member against a portion thereof.

7. A combination for mounting a jettisonable store on a thin aircraft wing and for releasing the store with ejective force, comprising: attachment structure carried by the store for anchoring the store to the wing at two points spaced apart in the direction of flight; two latch mechanisms mounted inside the wing for releasable engagement with said attachment structure at said two points respectively; means including a cylinder in recumbent position inside said wing for creating fluid pressure with an abrupt pressure rise; means to apply ejective force against the store in response to said fluid pressure, said force-applying means being structurally separate from the wing and having portions positioned for exposure to said fluid pressure to cause the force-applying means to be separated from the aircraft in response to the fluid pressure; and a recumbent latch-actuating piston in said recumbent cylinder operatively connected with said two latch mechanisms to unlatch the store in response to said fluid pressure.

8. In an apparatus for mounting a jettisonable store on a thin wing of an aircraft and for releasing the store with ejection force, the combination of: a shackle loop on said store to extend upward into the interior of said wing; a pair of rotatable hook members mounted inside said wing for rotation in a generally horizontal plane towards each other to closed positions for engaging said shackle loop and away from each other to open positions to release the shackle loop, said two hook members having upper beveled surfaces to seat said shackle loop whereby the load imposed by the shackle loop tends to open the two hook members; locking means movable between a normal position blocking release rotation of said hook members and a retracted position to free the hook members for release rotation; and means to retract said locking means when said ejection force is applied.

9. A combination as set forth in claim 8 which includes yielding means urging said locking means towards its normal blocking position.

10. A combination as set forth in claim 9 which includes yielding means urging said hook members towards their open positions.

11. A combination for mounting a jettisonable store on a wing of an aircraft and for releasing the store with ejection force, comprising: a pair of attachment members carried by said store and positioned to extend upward into the interior of said wing; a pair of spaced jaw members mounted in said wing for rotation in a generally horizontal plane for engagement with said pair of attachment members to anchor the store to the wing, the members of one of said pairs having sockets therein, said sockets facing in opposite directions, the other of said members having portions to seat into said sockets for interlocking engagement between the two pairs of members; a rotary member inside said wing having an upright axis of rotation; and links connecting said rotary member to said jaw members respectively to expand and contract the jaw members in response to rotation of said rotary member to cause the jaw members to engage and release said two attachment members, said rotary member and links having latching positions at which forces transmitted to said rotary member by said links are neutral with respect to tendency to rotate the rotary member in its unlatching direction, said rotary member being operative for unlatching rotation in response to the application of said ejection force.

12. A combination as set forth in claim 11 in which said two attachment members are oppositely directed arms of a yoke that is united with said store; and in which said two jaw members are rotatable towards each other for engagement with the ends of the yoke arms.

13. A combination as set forth in claim 1, in which one of said members forms the open end of said chamber in releasable engagement with the aircraft; and in which the two members have portions for mutual engagement to limit the expansion of the chamber whereby expansion of the chamber to its limit causes said one member to be jerked free from the aircraft.

References Cited in the file of this patent

UNITED STATES PATENTS

| | | |
|---|---|---|
| 2,421,807 | Richey | June 10, 1947 |
| 2,516,902 | Musser | Aug. 1, 1950 |
| 2,699,908 | Fletcher | Jan. 18, 1955 |
| 2,726,576 | Musser | Dec. 13, 1955 |